(12) United States Patent
Ali et al.

(10) Patent No.: US 10,315,757 B2
(45) Date of Patent: Jun. 11, 2019

(54) PROPELLER BLADE BETA TWIST

(71) Applicant: GoPro, Inc., San Mateo, CA (US)

(72) Inventors: Ihab A. Ali, Cupertino, CA (US); Reza Yazdani, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 389 days.

(21) Appl. No.: 15/182,589

(22) Filed: Jun. 14, 2016

(65) Prior Publication Data

US 2017/0355454 A1 Dec. 14, 2017

(51) Int. Cl.
*B64C 27/467* (2006.01)
*B64C 27/08* (2006.01)
*B64C 39/02* (2006.01)

(52) U.S. Cl.
CPC ............ *B64C 27/467* (2013.01); *B64C 27/08* (2013.01); *B64C 39/024* (2013.01)

(58) Field of Classification Search
CPC .......... B64C 27/467; F01D 5/12–5/147; F04D 29/38; F04D 29/384; F04D 29/388
USPC ...................................................... 416/241 R
See application file for complete search history.

(56) References Cited

U.S. PATENT DOCUMENTS

| | | | | |
|---|---|---|---|---|
| 1,082,750 A * | 12/1913 | Jacomy | ................... | F01D 5/147 29/889.6 |
| 1,313,599 A * | 8/1919 | Ingells | .................... | F01D 5/147 29/889.6 |
| 1,831,729 A * | 11/1931 | Adamcikas | ........... | F04D 29/384 416/203 |
| 2,027,745 A * | 1/1936 | Montgomery | ........ | F04D 19/002 415/131 |
| 2,157,999 A * | 5/1939 | Charavay | .............. | F04D 29/384 416/242 |
| 2,231,746 A * | 2/1941 | Ballentine | ............... | F24F 7/007 415/8 |
| 2,345,047 A * | 3/1944 | Houghton | ............... | B64C 11/18 416/223 R |
| 3,822,105 A * | 7/1974 | Jepson | .................. | B64C 27/463 416/223 R |

(Continued)

OTHER PUBLICATIONS

A practical approach for selecting optimum wind rotors, by Maalawi and Badr, 2002 (Year: 2002).*

*Primary Examiner* — Jason D Shanske
*Assistant Examiner* — Brian O Peters
(74) *Attorney, Agent, or Firm* — Young Basile Hanlon & MacFarlan, P.C.

(57) ABSTRACT

A propeller blade comprises a blade root coupled to a rotor hub and a blade tip. The propeller blade is composed of airfoil cross-sections, each cross-section a distance away from the rotor hub. Each airfoil is designed with particular structural characteristics that improve the overall amount of thrust generated on the quadcopter. Namely, each airfoil possesses a β angle and chord length whose values depend on the distance of that airfoil from the rotor hub. For example, the relationship between an airfoil's β angle and its distance from the rotor hub is described by a power law. Additionally, the relationship between an airfoil's chord length and its distance from the rotor hub is described using a polynomial regression. Compared to current, off the shelf propeller blades, the current propeller blade embodiment achieves the same thrust at a lower RPM, thereby yielding benefits in reduced acoustic noise and improved response time.

17 Claims, 8 Drawing Sheets

(56) References Cited

U.S. PATENT DOCUMENTS 7,600,976 B2 * 10/2009 Bagai .................. B64C 27/10
                                                                              416/223 R
D790,430 S * 6/2017 Ali .......................... D12/214

* cited by examiner

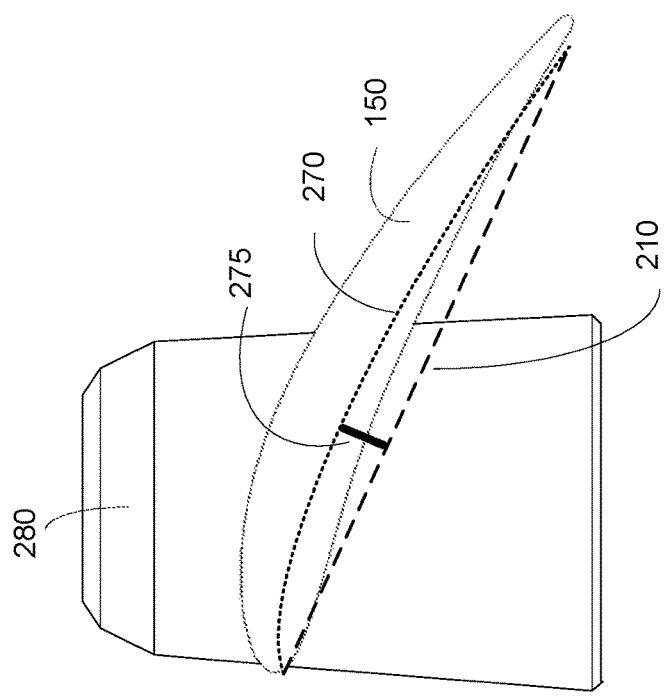
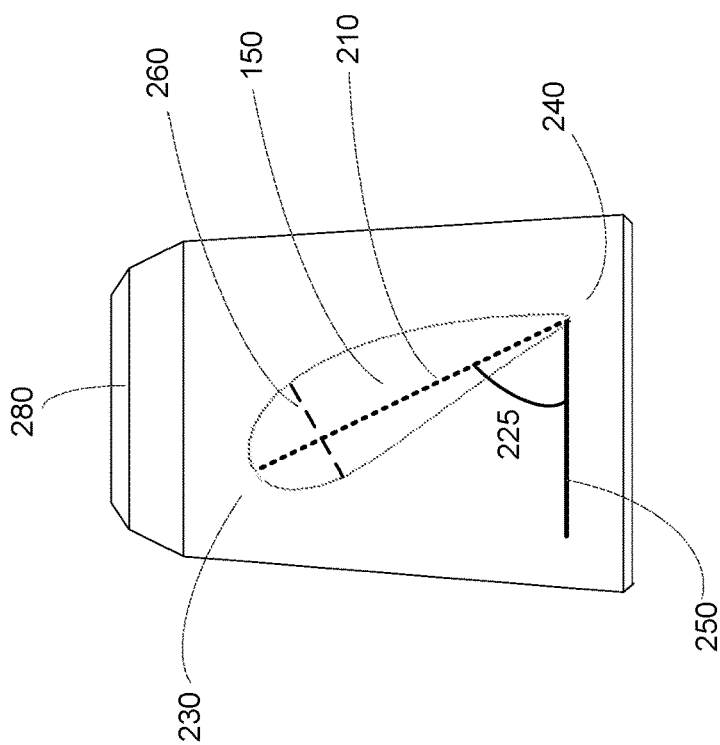
FIG. 2A
FIG. 2B

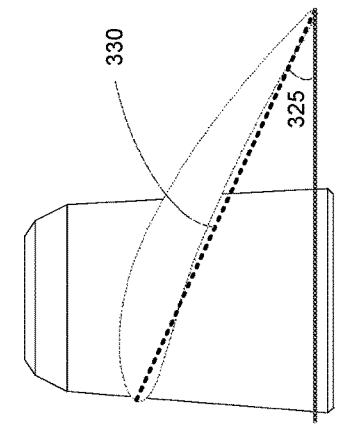
FIG. 3C
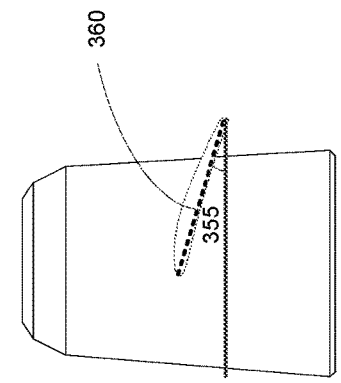
FIG. 3F
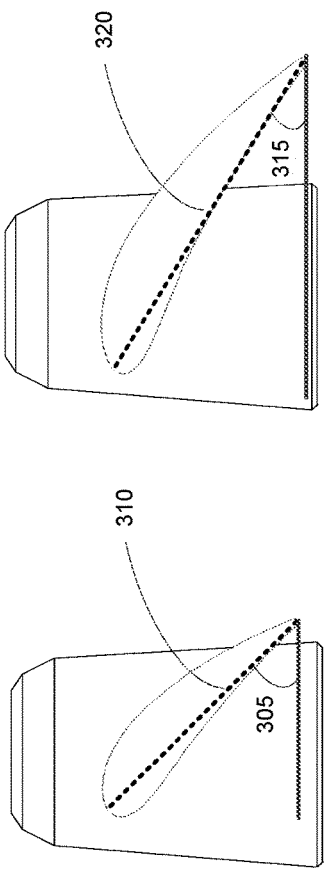
FIG. 3B
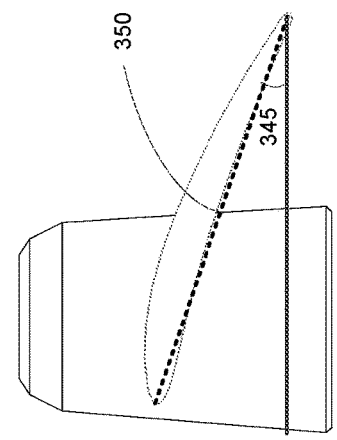
FIG. 3E
FIG. 3A
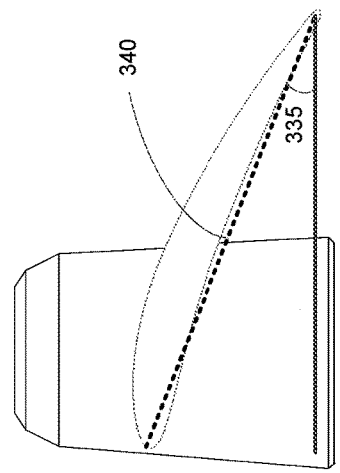
FIG. 3D

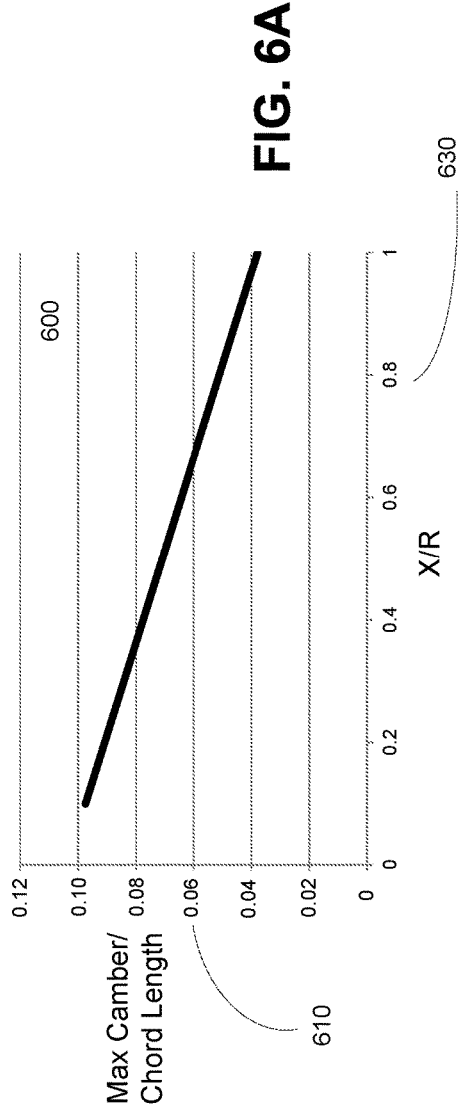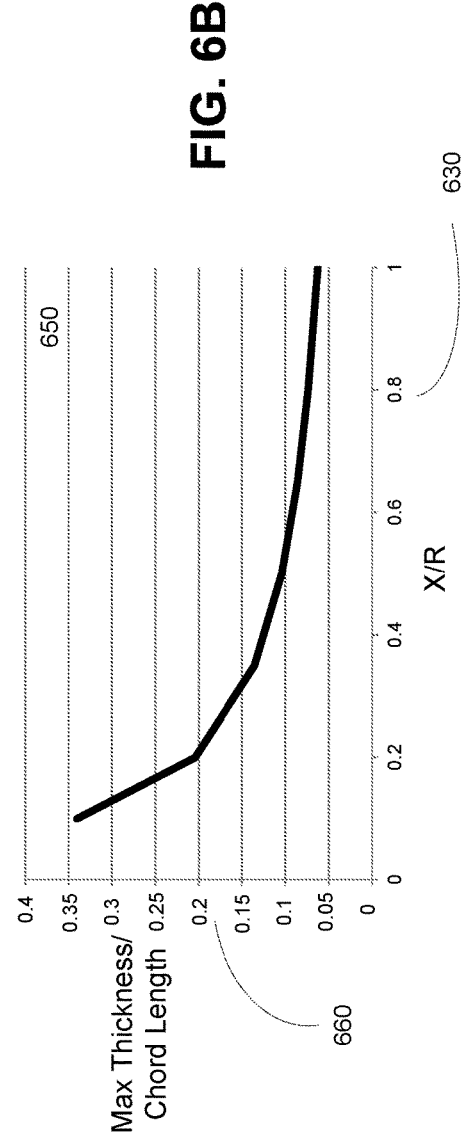

|  | Conventional Propeller | | | Current Propeller Embodiment | | |
|---|---|---|---|---|---|---|
|  | Thrust (g) | RPM | PWR_elec | Thrust (g) | RPM | PWR_elec |
| Hover Thrust | 460 | 6466 | 51.5 | 460 | 4800 | 50.7 |
| Max Thrust Req > | 1000 | 9292 | 157 | 1000 | 6944 | 175 |
| RPM_Delta (460g to 1000g) | - | 2826 | - | - | 2144 | - |

PROPELLER BLADE BETA TWIST

TECHNICAL FIELD

This disclosure relates to propeller blade designs, and more specifically, a propeller blade with design characteristics that generates increased thrust at a lower number of rotations per minute.

BACKGROUND

Propeller blades are designed to provide sufficient thrust to achieve flight in unmanned rotary wing vehicles (or drones), for example, quadcopters. By increasing the rotations per minute (RPM) of a propeller blade, a quadcopter is able to similarly increase the amount of thrust generated. However, increasing the RPM of a propeller blade is often limited by the maximum rated RPM of the propeller blade or the motor that drives the propeller. For example, the propeller blade may be coupled to a rotational hub that is mechanically limited as to how fast it may turn the propeller blades. Increasing the number of propellers on a quadcopter can lower the thrust required from each propeller, but the addition of propellers is often unachievable barring a major redesign of the quadcopter itself. Moreover, propeller blades that generate higher levels of thrust increase power consumption, thereby reducing battery life.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIGS. 2A and 2B illustrate structural parameters of an airfoil cross-section of a propeller blade, in accordance with an example embodiment.

FIGS. 3A-3F illustrate airfoil cross-sections of a propeller blade at varying distances from the rotor hub, in accordance with an example embodiment.

FIGS. 6A and 6B illustrate the maximum camber and maximum thickness, respectively, of the airfoil as a function of the distance from the rotor hub, in accordance with an example embodiment.

DETAILED DESCRIPTION

Figure 1:
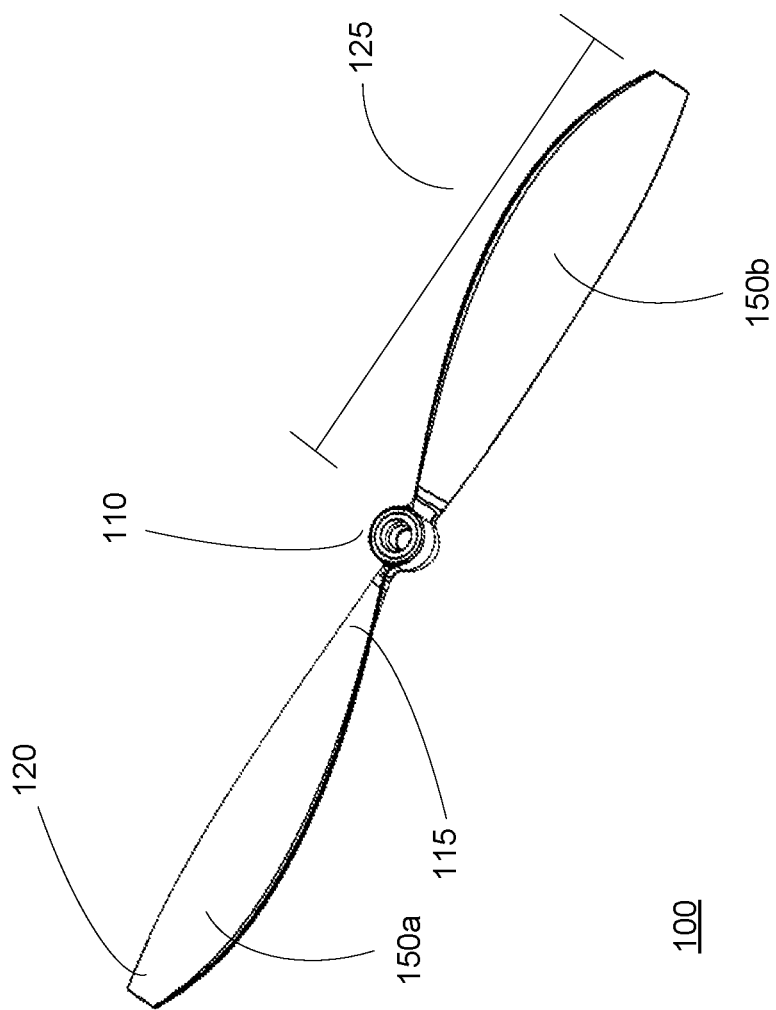
FIG. 1 illustrates a propeller, in accordance with an example embodiment.

The figures and the following description relate to preferred embodiments by way of illustration only. It should be noted that from the following discussion, alternative embodiments of the structures disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system for purposes of illustration only. One skilled in the art will readily recognize from the following description that alternative embodiments of the structures illustrated herein may be employed without departing from the principles described herein.

Overview Configuration

Disclosed by way of example embodiments is a design of a propeller blade that can increase the generated thrust on an unmanned rotary winged vehicle, e.g., a quadcopter, at lower propeller blade rotations per minute (RPM). For ease of discussion, the disclosure will be described with respect to a quadcopter, but the principles herein can apply to other rotary winged aerial vehicles.

The propeller blade (or blade) has a tip at one end and root at an opposite end. The root of the blade couples a rotor (or rotating) hub that is powered by a motor of the quadcopter. The tip of the blade is an end opposite from the rotor hub. The rotor hub may be driven by a motor. The rotor hub may be incorporated with the motor. The propeller, rotor hub and the motor may form a propeller assembly.

As speed of the motor is increased, the RPM of the rotor hub, and in turn, the propeller blade increases. The increase in RPM generates thrust on the propeller blade on the quadcopter. An increase in thrust allows for lift. It is noted there may be one or more propeller assemblies and as the motor RPM on each increases and corresponding RPM of the propeller blade increases, the overall thrust from each propeller assembly can lift the quadcopter.

In various example embodiments, the propeller blade is designed with a particular beta (β) twist to increase the generated thrust. The β twist describes a manner in which the β angle of a propeller blade airfoil changes when proceeding from the root of the blade to the tip of the blade. For example, the β angle may be maximized at the blade root and minimized at the blade tip. In other embodiments, the generated thrust is increased by designing the propeller blade with airfoil chord lengths that vary as a function of the distance of the airfoil from the rotor hub where the blade root is coupled. The β twist and chord length designs may be combined in some embodiments to further increase the generated thrust on the propeller blade. In various embodiments, the maximum camber and maximum thickness of each airfoil are also designed to increase the generated thrust on the propeller blade.

Example Propeller Blade

Referring now to FIG. 1, it illustrates a propeller 100, in accordance with an example embodiment. The propeller 100 includes a central connector 110. In various embodiments, the central connector 110 is coupled to a rotor hub driven by a motor. The propeller 100 comprises two opposing propeller blades (or blades) 150a, 150b (generally 150). Each blade 150 includes a tip 120 and a root 115. The root 115 of each blade 150 is nearest to the central connector 110. The tip of the blade 120 may freely float a distance corresponding to the length of the blade on a side of the blade 150 opposite of the root 115.

The length of the blade 150 may be referred to as R, the blade radius 125. Although FIG. 1 depicts two separate blades 150 on opposite sides of the central connector 110, in other embodiments, the propeller may include three, four, or more blades that are each coupled to the central connector 110 as described. In such multi-blade configurations, the blades may be spread evenly around the central connector 110 so that the angular distance between any two blades is equal.

Airfoil Cross-Section of a Propeller Blade

FIGS. 2A and 2B illustrate the propeller assembly from a perspective view from a tip 120 of the blade 150 in accordance with an example embodiment. Both figures illustrate a rotor hub 280 and the blade 150. Further, FIGS. 2A and 2B illustrate structural parameters of an example airfoil cross-section of the blade 150 in accordance with an example embodiment.

Each airfoil includes a chord length 210 that may be the distance between a leading edge 230 of the airfoil of the blade 150 and a trailing edge 240 of the airfoil of the blade 150. A maximum thickness 260 of the airfoil is measured as the longest distance connecting the top and bottom of the airfoil of the blade 150. A vector representing this longest distance may be perpendicular to the chord length 210. Additionally, each airfoil has a angle 225, defined as the angle between the chord length 210 and a plane of rotation 250 of the blade 150. Each airfoil also possesses a camber line 270, which may refer to the camber or curvature of the airfoil. The camber line 270 may bisect the airfoil so 50% of the airfoil mass is above and below the line. The maximum distance between the camber line 270 and the chord 210 is defined as the maximum camber 275 of the airfoil.

In various embodiments, FIG. 2A illustrates the airfoil cross-section at the location where the rotor hub 280 is connected to the root 115 of the blade 150. By way of example, assuming that "X" represents the distance of the airfoil cross-section from the rotor hub 280 and "R" represents the radius of the propeller blade, FIG. 2A illustrates an embodiment of the airfoil at X/R=0.1. In some example embodiments, the connection between the rotor hub 280 and propeller blade 150 occupy a distance 0<X/R<0.1. FIG. 2B illustrates the airfoil cross-section at farther distances from the rotor hub 280. For example, FIG. 2B may illustrate an embodiment of the airfoil between 0.35<X/R≤0.5.

Beta Twist of the Propeller Blade

FIGS. 3A-3F illustrate additional examples of the propeller assembly. The figures show airfoil cross-sections of the blade 150 at varying distances from the rotor hub 280, in accordance with an example embodiment. Each depicted airfoil possesses a β angle 305, 315, 325, 335, 345, and 355, and a respective chord length 310, 320, 330, 340, 350, and 360.

In various embodiments, FIG. 3A depicts an airfoil cross-section located between 0.1<X/R≤0.2, FIG. 3B depicts the airfoil cross-section located between 0.2<X/R≤0.35, FIG. 3C depicts the airfoil cross-section located between 0.35<X/R≤0.5, FIG. 3D depicts the airfoil cross-section located between 0.5<X/R≤0.65, FIG. 3E depicts the airfoil cross-section located between 0.65<X/R≤0.8, and FIG. 3F depicts the airfoil cross-section located between 0.8<X/R≤1.0. One skilled in the art may readily recognize that the aforementioned bounds on X/R for each depiction are merely indicated as guiding distances. For example, in other embodiments, FIG. 3A may depict the airfoil at X/R=0.25.

In some embodiments, the airfoil nearest to the blade root 115 has the largest β angle 225. Proceeding along R, the radius of the blade, the β angle successively decreases until its value is the smallest at the blade tip 120 (e.g. FIG. 3F). Further discussion regarding the overall β twist of the propeller blade is provided with FIG. 4.

Beta Angle of Airfoil Cross-Sections

Figure 4:
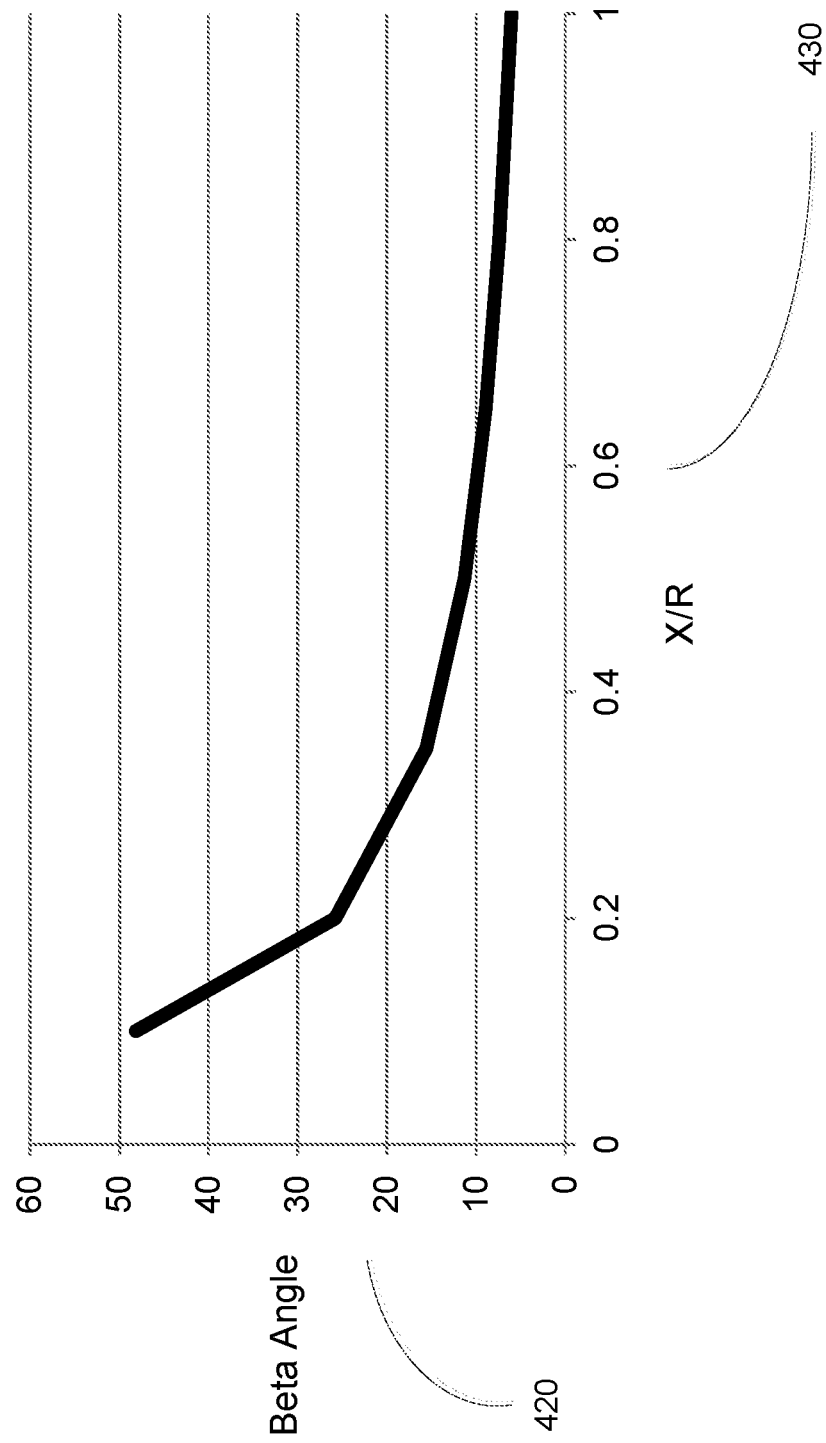
FIG. 4 is a graph illustrating the β angle as a function of the distance from the rotor hub, in accordance with an example embodiment.

FIG. 4 is a graph illustrating the β angle 225 as a function of the distance from the rotor hub 280, in accordance with an embodiment of the invention. Here, the Y-axis 420 represents the airfoil's β angle 225 measured in degrees, whereas the X-axis 430 is the ratio X/R, defined as the ratio between X, the airfoil's distance from the rotor hub 280 and R, the blade radius 125.

Optimization of the β twist design for a propeller blade may be experimentally determined using computational fluid dynamic modeling. In various embodiments, designs of the blade 150 may include the propeller radius, airfoil sections, chord distributions, and camber distributions are fixed while the β angle of each airfoil is varied to identify the optimal design that generates a maximum thrust. In some embodiments, the thrust generated on a design of a blade 150 of a propeller is modeled using the Eddy Viscosity Transport Model with appropriate boundary limits (e.g. opening boundary condition: 1 atm and 25° C.) at a propeller RPM of 6000. In other embodiments, discretization methods such as finite volume/element methods and spectral element methods, or turbulent models including Reynolds-averaged Navier-Stokes and probability density function methods may be used to calculate the optimal β twist. Commercial software such as ANSYS, STAR-CD, and FEMLAB may be used to accomplish the calculations.

Generally, the β angle 225 is highest near the root 115 of the blade 150. For example, at X/R=0.1, the β angle may be 48 degrees. In other examples, the β angle at X/R=0.1 may range from 43 degrees to 53 degrees. In some embodiments, the β angle for distances of 0<X/R<0.1, may be a constant nearly equal to the β angle at X/R=0.1. Conversely, the β angle 335 near the blade tip 120 at X/R=1.0 is the smallest. Here, the β angle 335 may be 6 degrees. In other examples, the β angle 335 at X/R=1.0 ranges from 5 to 7 degrees.

In various embodiments, the β twist follows a power law decay. For example, for 0.1≤X/R≤1.0, the relationship between the β angle and X/R may be described by the curve fit equation $$\beta \text{ angle} = B_1 * \left(\frac{X}{R}\right)^{-B_2}$$

where $B_1$ and $B_2$ are constants for the curve fit. As an example, $B_1=6.0\pm1.0$ and $B_2=-0.90\pm0.12$.

The β twist design enables the blade 150 of the propeller to maintain a relatively constant angle of attack for each airfoil cross-section along the radius of the blade 125. For example, as the blade 150 increases in RPM, the velocity of the tip 120 of the blade 150 is significantly higher than the velocity of the root 115 of the blade 150 because the blade 150 of the propeller is rotating around a central point. The β twist prevents the tip 120 of the blade 150 from stalling at high rotational velocities while maximizing the generated lift along the radius 125 of the blade 150.

Chord Length of Airfoil Cross-Sections

Figure 5:
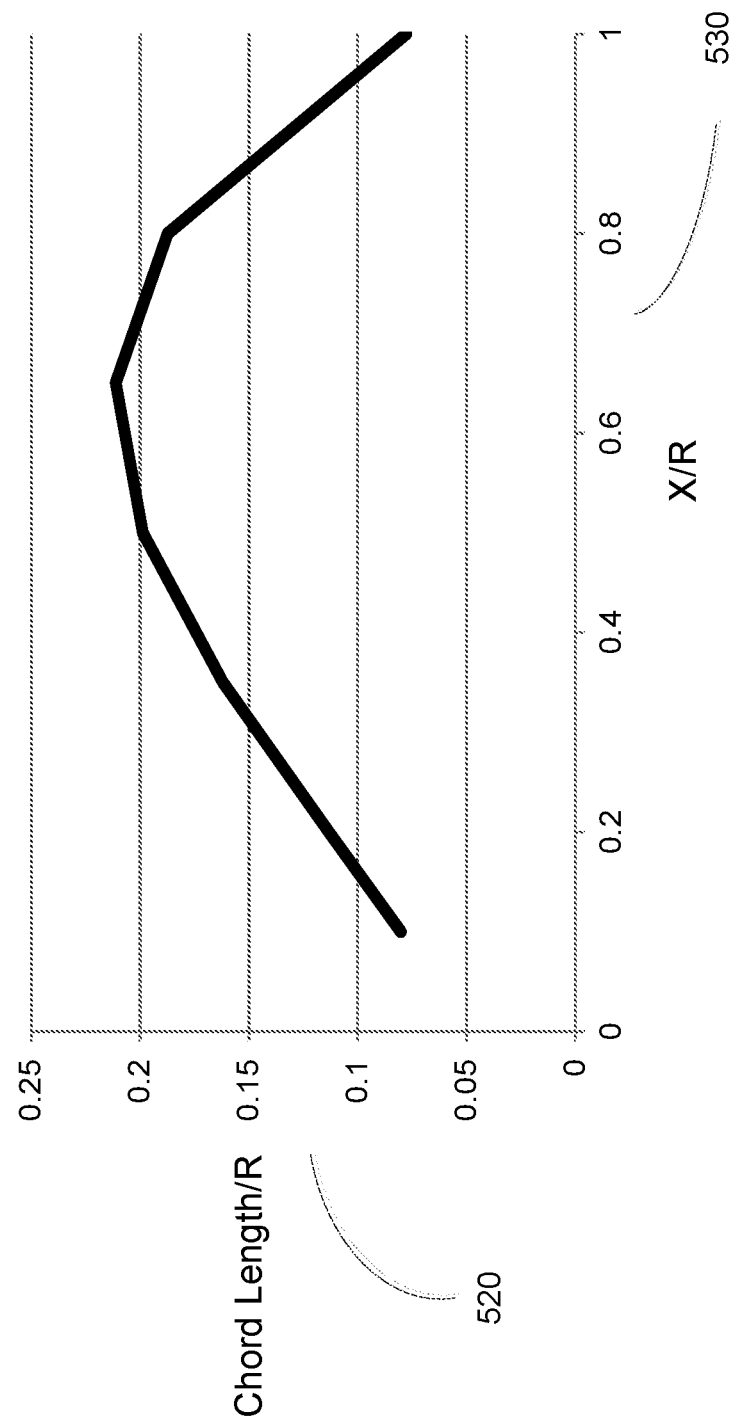
FIG. 5 is a graph illustrating the chord length as a function of the distance from the rotor hub, in accordance with an example embodiment.

FIG. 5 is a graph illustrating the chord length 210 as a function of the distance from the rotor hub 280, in accordance with an example embodiment. Here, the Y-axis 520 represents the ratio C/R, defined as the ratio of C, the airfoil's chord length 210 to R, the blade radius 125. The X-axis 530 represents the ratio X/R, defined as the ratio between X, the distance of the airfoil from the root 115 of the blade 150, and R, the radius 125 of the blade 150.

In various embodiments, the chord length 210 of an airfoil is the smallest near the root 115 of the blade 150, increases along the radius 125 of the blade 150 until a critical distance, and decreases again towards the tip 120 of the blade 150. For example, at X/R=0.1, the ratio of C/R=0.080. At X/R=1.0, the ratio of C/R=0.077. In other embodiments, the ratio of C/R may be 10% higher or lower than the stated values of C/R=0.080 and 0.077 at X/R=0.1 and 1.0 respectively.

In various embodiments, the critical distance at which the chord length 210 is maximized occurs at X/R=0.65. This critical distance is determined by computational fluid dynamic modeling of the generated lift on different airfoil cross-sections of the propeller blade. In other embodiments, the chord length 210 may be maximized at X/R values ranging from X/R=0.6 to X/R=0.75. A maximal chord length 210 at the critical distance increases the blade area, thereby increasing the generated lift at that airfoil cross-section. However, the chord length 210 is carefully selected to avoid increasing the drag associated with the increased blade area. As depicted in FIG. 5, the maximized chord length value is C/R=0.211. In other embodiments, the maximized chord length value may range from 0.19<C/R<0.23.

In various embodiments, C/R, or the ratio of the chord length 210 of an airfoil to the blade radius 125 follows a polynomial model. For example, for 0.1≤X/R≤1.0, the relationship between the β angle and X/R may be described by the curve fit equation $$\frac{C}{R} = A_1 * \left(\frac{X}{R}\right)^3 + A_2 * \left(\frac{X}{R}\right)^2 + A_3 * \left(\frac{X}{R}\right) + A_4$$

where $A_1$, $A_2$, $A_3$, and $A_4$ are curve fit constants for maximizing C/R when X/R=0.65. As an example, $A_1$=−0.60±0.06, $A_2$=0.36±0.04, $A_3$=0.26±0.03, and $A_4$=0.05±0.005.

Maximum Camber and Thickness of Airfoil

FIGS. 6A and 6B illustrate the maximum camber and maximum thickness, respectively, of the airfoil as a function of the distance from the rotor hub 280, in accordance with an example embodiment. The maximum camber, MC, 275 and maximum thickness, MT, 260 of an airfoil were previously described with FIGS. 2A and 2B. In graph 600, the Y-axis 610 represents MC/C, defined as the ratio between MC, the maximum camber 275 and C, the chord length 210 of an airfoil. Similarly for graph 650, the Y-axis 660 represents MT/C, defined as the ratio between MT, the maximum thickness 260 and C, the chord length 210 of an airfoil. In both FIGS. 6A and 6B, the X-axis 630 represents the X/R, defined as the ratio between X, the airfoil's distance from the blade root 115, and R, the blade radius 125.

In various embodiments, MC/C, or the ratio of the maximum camber 275 of an airfoil to the chord length 210 follows a linear model. For example, for 0.1≤X/R≤1.0, the relationship between MC/C and X/R may be described by the linear curve fit equation $$\frac{MC}{C} = D_1 * \left(\frac{X}{R}\right) + D_2$$

where $D_1$ and $D_2$ are linear curve fit constants. For example, $D_1$=−6.6±2.0 and $D_2$=10.4±1.3.

In various embodiments, MT/C, or the ratio of the maximum thickness 260 of an airfoil to the chord length 210 follows a power law decay. For example, for 0.1≤X/R≤1.0, the relationship between MT/C and X/R may be described by the power law decay curve fit equation $$\frac{MT}{C} = E_1 * \left(\frac{X}{R}\right)^{-E_2}$$

where $E_1$ and $E_2$ are power law decay curve fit constants. For example, $E_1$=6.2±0.8 and $E_2$=0.7±0.1.

Improved Thrust of Propeller Blade Embodiment

Figures 7A, 7B:
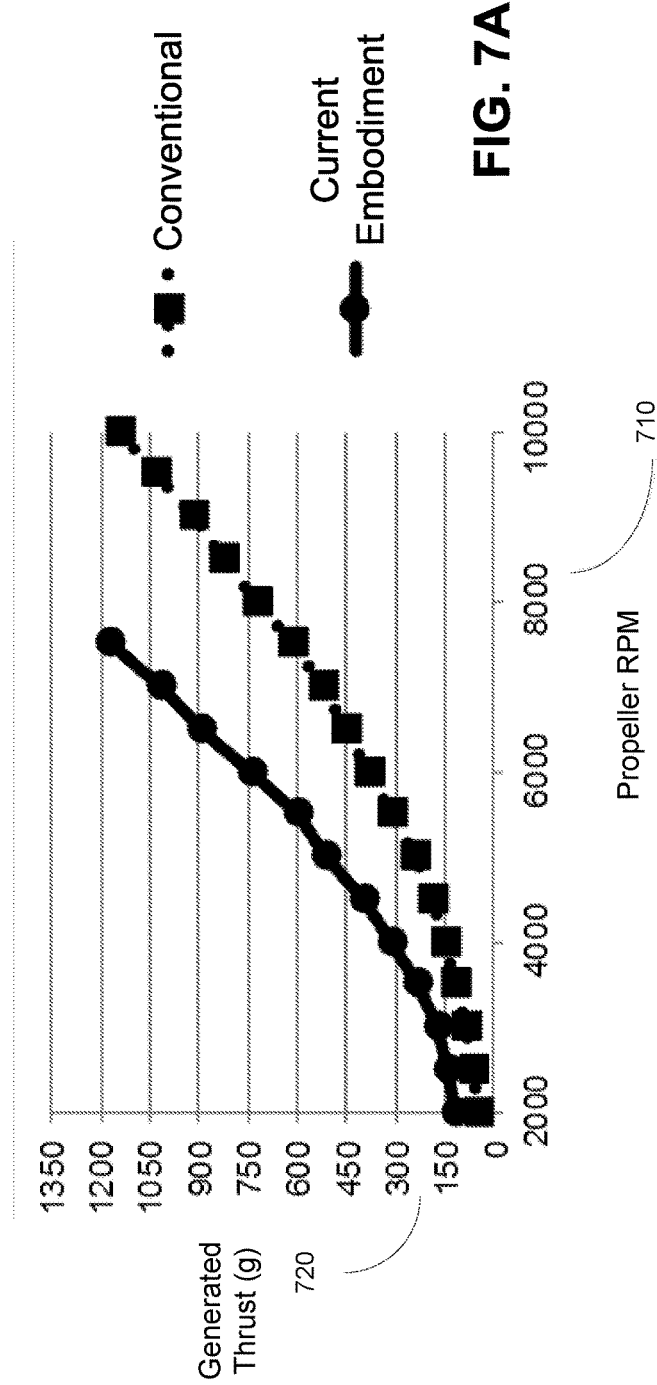
FIGS. 7A and 7B illustrates the performance of the propeller in comparison to an off the shelf propeller, in accordance with an example embodiment.

FIGS. 7A and 7B illustrate an example of performance of the propeller in comparison to a conventional propeller. FIG. 7A illustrates the relationship between the propeller RPM 710 and the generated thrust 720. FIG. 7B depicts the performance variables, such as the propeller RPM and power consumption (PWR_elec), that are required to achieve the hover thrust and maximum thrust using a conventional propeller and current propeller embodiment. In this example, a quadcopter may weigh approximately 1820 grams, stores a battery capacity of 5200 milliampere-hours (mAh), and has four individual propellers. Each propeller in this example has two propeller blades 150. In the current example embodiment, each 10"×3.2" propeller has a diameter of 10 inches (or a radius of 5 inches), a pitch of 3.2 inches, and a mass of 12 grams. The pitch is defined as the theoretical upward displacement that the propeller will achieve in a complete spin of 360 degrees assuming negligible slip. Furthermore, the propeller blade is designed in accordance with the beta twist and chord length illustrated in FIG. 4 and FIG. 5. In comparison, the conventional propeller represents a propeller with the same diameter (10 inches) and pitch (3.2 inches).

FIG. 7A shows that at any propeller RPM, the generated thrust 720 of the current propeller embodiment is significantly higher than the thrust of the conventional propeller. At 6000 RPM, a propeller as described by the embodiments herein generates a thrust (735 g) that is nearly double that of the conventional propeller (385 g). Given that there are four individual propellers on a quadcopter, each propeller having two blades as described in the previous embodiments, improving the performance of each propeller blade can yield significant benefits. For example, it may allow for faster lift or descent.

It is noted that in this example embodiment, each propeller bears a quarter of the quadcopter weight (1820 grams) to achieve a hovering state. A conventional 10"×3.2" propeller with two blades achieves the necessary thrust (460 g) at 6466 RPM. Conversely, for a propeller described with the embodiments herein (e.g. 10"×3.2" with two propeller blades), a propeller would need to rotate at 4800 RPM, representing a 25% decrease compared to the conventional propeller. Similarly, this 25% reduction holds when targeting a maximum required thrust of 1000 g. The conventional propeller would need to achieve 9292 RPM whereas the propeller as per the embodiments herein may achieve the same max thrust at a significantly lower 6944 RPM.

Additionally, the power consumption between the conventional propeller and current embodiment remains comparable within the hover range of a vehicle weight of 1820 g. For example, in achieving hover thrust, the power consumption of a motor that drives the conventional and the propeller as described in the embodiments herein is 51.5 W and 50.7 W respectively. Given that the power consumption of the current propeller embodiment has not increased significantly, the propeller as structured per the embodiments disclosed herein may adequately function on the same 5200 mAh battery capacity. For example, for the current propeller embodiment, a typical 4S Li-poly battery pack has a nominal voltage of 14.8 V. For each motor, this translates to 3.4 A (50.7 W divided by 14.8 V). In various embodiments, the quad-copter possesses four motors, each motor driving an individual propeller. Therefore, the flight time for a quad-copter carrying a 5200 mAh battery is approximately 23 minutes.

The advantages of this reduction in RPM may be highly beneficial. For example, a reduced RPM enables a quieter propeller while in flight. This may be a relevant improvement for avoiding detection (e.g. stealth drones) or simply to avoid being a noise nuisance.

Another example of reduced RPM benefits may be a corresponding reduction in the ramp time. Assuming that the rotational acceleration of the conventional propeller and the current propeller embodiment is the same, the current propeller embodiment achieves the required RPM to overcome the weight of the quadcopter (e.g. RPM=4800) at a much faster rate than conventional propeller (e.g. RPM=6466). In other words, the response time of the quadcopter is significantly reduced, enabling the quadcopter to make rapid adjustments during flight.

Yet another example of reduced RPM from a propeller structure as described by the embodiments herein may be an increase of the maximum thrust corresponding to the maximum RPM of the propeller blade. For the conventional propeller, the maximum RPM is around 10,000 to 15,000 RPM. To further increase thrust, one may have to redesign the quadcopter body to include additional propellers and subsequently, a larger battery to provide power to the additional propellers. The current propeller embodiment may achieve significantly higher levels of thrust while remaining below the maximum range of 10,000 to 15,000 RPM.

One skilled in the art may appreciate that the advantages of this current propeller embodiment may be translated to other quadcopter designs. For example, if the quadcopter mass were to decrease (or even increase) from its current mass of 1820 grams, then the RPM required to achieve hover thrust or maximum thrust may similarly decrease (or increase) accordingly. Compared to the conventional propeller, the current propeller embodiment can always achieve the necessary thrust at a lower RPM, thereby providing the quadcopter the aforementioned advantages.

Propeller Efficiency

Figure 8:
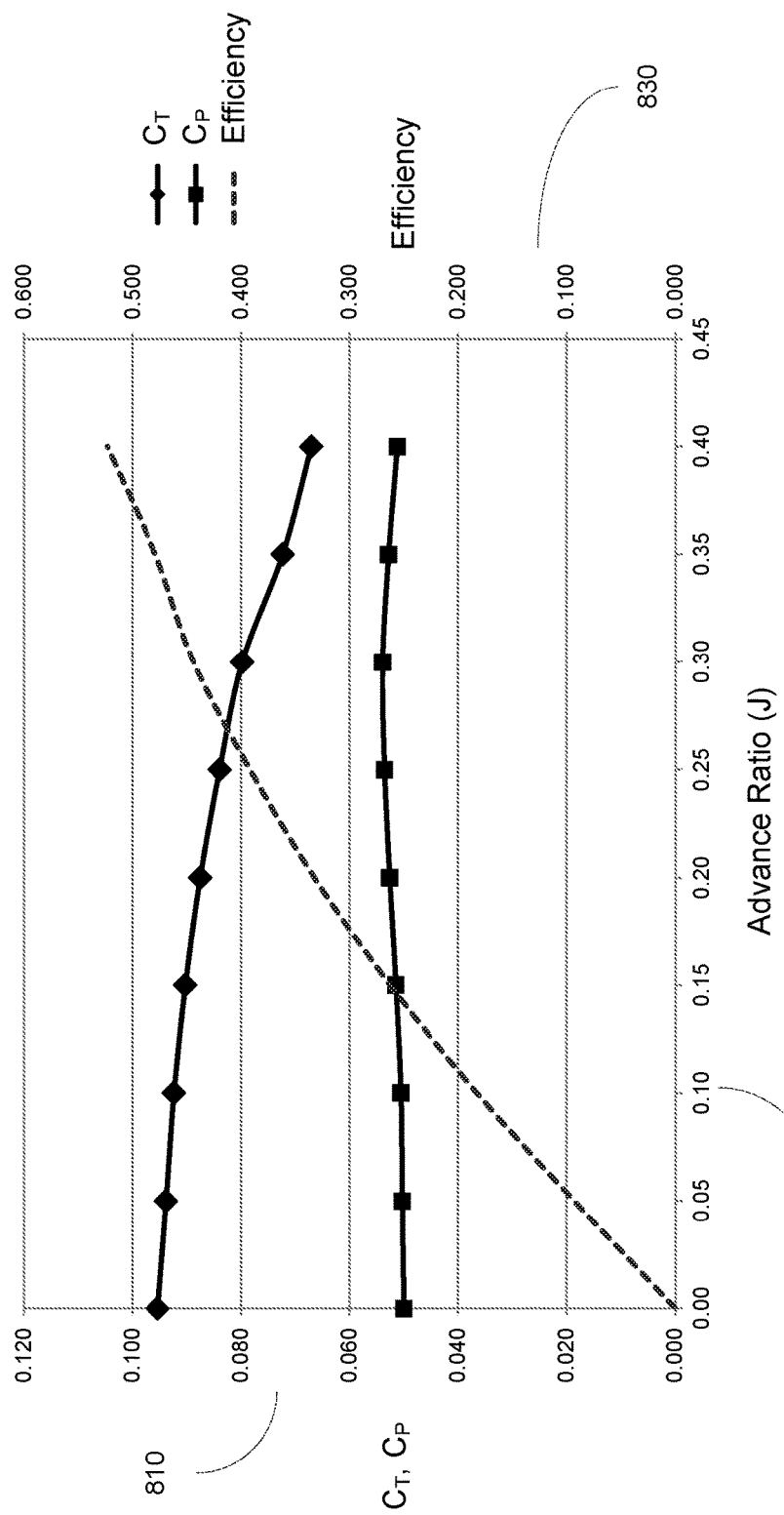
FIG. 8 illustrates the coefficient of thrust, coefficient of power, and efficiency of the propeller, in accordance with an example embodiment.

FIG. 8 illustrates the relationship between thrust coefficient, power coefficient, and efficiency of the propeller, in accordance with an embodiment of the invention. The left Y-axis 810 depict the thrust coefficient and power coefficient while the right Y-axis 830 represents the propeller efficiency. The X-axis 820 represents the propeller advance ratio.

The efficiency of a propeller is defined as $$\eta = J * \frac{C_T}{C_P}$$

where J is the advance ratio of the propeller, $C_T$ is the thrust coefficient, and $C_P$ is the power coefficient. $C_T$ and $C_P$ are directly proportional to thrust and power, respectively. The advance ratio is further defined as $$J = \frac{V_{in}}{\omega * D}$$

where $V_{in}$ is the velocity of the freestream fluid (air), $\omega$ is the rotational velocity of the propeller, and D is the diameter of the propeller blade. Therefore, when the quadcopter is flying at high speeds relative to the air (high $V_{in}$) or when the propeller is rotating at lower RPM (small $\omega$), the advance ratio will be larger. FIG. 8 illustrates the changes in thrust coefficient, power coefficient, and propeller efficiency between the ranges of $0 \leq J \leq 0.4$. In this range, the propeller efficiency is maximized at J=0.4 at 52% efficiency.

Additional Embodiment Considerations

Throughout this specification, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment," "some embodiments," or "various embodiments" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for propeller blades as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement and details of the apparatus disclosed herein without departing from the spirit and scope defined in the appended claims.

What is claimed is:

1. A propeller blade comprising:
a root, a tip, and a plurality of airfoil cross-sections extending from the root to the tip, each airfoil cross-section having a β angle and located at a distance, X, from the root, wherein the airfoil cross-section with a maximum β angle is located at X/R=0.1 and the airfoil cross-section with a minimum β angle is located at X/R=1.0 where R is the radius of the blade, wherein the β angle of each airfoil cross-section is governed by the equation: $\beta = B_1 (X/R)^{-B_2}$ for $0.1 \leq X/R \leq 1.0$, where $B_1$ and $B_2$ are constants based on a curve fit between β and X/R.

2. The propeller blade of claim 1, wherein $B_1$ is between 5 and 7 and $B_2$ is between −0.75 and −1.05.

3. The propeller blade of claim 1, wherein the maximum β angle located at X/R=0.1 is between 40 and 55 degrees.

4. The propeller blade of claim 1, wherein the minimum β angle located at X/R=1.0 is between 2 and 10 degrees.

5. The propeller blade of claim 1, wherein the radius of the blade is 3 to 7 inches in length.

6. The propeller blade of claim 1, wherein the root of the propeller blade is coupled to a rotor hub at distances of $0<X/R\leq0.1$.

7. A propeller blade comprising:
a root, a tip, and a plurality of airfoil cross-sections extending from the root to the tip, each airfoil cross-section having a chord length, C, and located at a distance, X, from the root, wherein the airfoil cross-section with a maximum chord length is located between $0.5\leq X/R\leq 0.75$, where R is the radius of the blade, wherein the chord length of each airfoil cross-section is governed by the polynomial equation: $C/R=A_1(X/R)^3+A_2(X/R)^2+A_3(X/R)+A_4$ for $0.1\leq X/R\leq 1.0$, where $A_1$, $A_2$, $A_3$, and $A_4$ are constants based on a curve fit between C/R and X/R.

8. The propeller blade of claim 7, wherein $A_1$ is between $-0.7$ and $-0.5$, $A_2$ is between 0.3 and 0.4, $A_3$ is between 0.2 and 0.3, and $A_4$ is between 0.04 and 0.06.

9. The propeller blade of claim 7, wherein the cross section further comprises:
a maximum camber, MC, governed by the equation: $MC/C=D_1(X/R)+D_2$, where $D_1$ and $D_2$ are constants based on a linear curve fit between MC/C and X/R.

10. The propeller blade of claim 9, wherein $D_1$ is between $-4.5$ and $-9.0$ and $D_2$ is between 9 and 12.

11. The propeller blade of claim 7, wherein the cross section further comprises:
a maximum thickness, MT, governed by the equation: $MT/C=E_1(X/R)^{-E_2}$, where $E_1$ and $E_2$ are constants based on a power law between MT/C and X/R.

12. The propeller blade of claim 11, wherein $E_1$ is between 5 and 7 and $E_2$ is between 0.5 and 1.0.

13. A propeller assembly comprising:
a rotor hub; and
at least two propeller blades, each propeller blade further comprising:
a root and a tip, wherein the root of the propeller blade is connected to the rotor hub and the tip of the propeller blade is located a length of the propeller blade, R, from the rotor hub; and
a plurality of airfoil cross-sections extending from the root to the tip, each airfoil cross-section located at a distance, X, from the rotor hub, wherein airfoil cross-sections located between $0.5\leq X/R\leq 1.0$ each have a β angle that is smaller than 25% of the maximum β angle in the plurality of airfoil cross-sections, wherein the β angle has a maximum value between 40 and 55 degrees.

14. The propeller blade of claim 13, wherein β angle is maximized at $X/R=0.1$.

15. The propeller blade of claim 13 wherein the β angle is minimized at $X/R=1.0$.

16. The propeller blade of claim 13 wherein the β angle has a minimum value between 2 and 7 degrees.

17. The propeller assembly of claim 13, wherein the airfoil cross-section of the propeller blade that possesses a maximum chord length is located between $0.5\leq X/R\leq 1.0$.

* * * * *